(12) United States Patent
Eun

(10) Patent No.: US 12,087,120 B2
(45) Date of Patent: Sep. 10, 2024

(54) METHOD FOR IDENTIFYING COIN

(71) Applicant: SAITEC INC., Jeollanam-do (KR)

(72) Inventor: Nam Pyo Eun, Gwangju (KR)

(73) Assignee: SAITEC INC., Jeollanam-do (KR)

( * ) Notice: Subject to any disclaimer, the term of this patent is extended or adjusted under 35 U.S.C. 154(b) by 135 days.

(21) Appl. No.: 17/982,545

(22) Filed: Nov. 8, 2022

(65) Prior Publication Data

US 2023/0147055 A1 May 11, 2023

(30) Foreign Application Priority Data

Nov. 9, 2021 (KR) .................. 10-2021-0153331

(51) Int. Cl.
*G07D 5/08* (2006.01)
*G01N 27/82* (2006.01)
*G07D 3/16* (2006.01)

(52) U.S. Cl.
CPC .............. *G07D 5/08* (2013.01); *G01N 27/82* (2013.01); *G07D 3/16* (2013.01); *G07D 2205/00* (2013.01)

(58) Field of Classification Search
CPC ........ G07D 5/08; G07D 3/16; G07D 2205/00; G07D 3/14; G07D 5/00; G07D 5/02; G01N 27/82
See application file for complete search history.

(56) References Cited

U.S. PATENT DOCUMENTS

| 5,687,829 | A | * | 11/1997 | Churchman | ............ | G07D 5/02 |
| | | | | | | 194/317 |
| 6,056,104 | A | * | 5/2000 | Neubarth | ................. | G07D 1/02 |
| | | | | | | 194/317 |
| 6,311,820 | B1 | * | 11/2001 | Hallas Bell | ............. | G07D 5/08 |
| | | | | | | 194/317 |
| 10,500,498 | B2 | * | 12/2019 | Lowery | ................... | A63F 13/60 |
| 2022/0321578 | A1 | * | 10/2022 | Xu | ........................ | H04L 63/126 |

FOREIGN PATENT DOCUMENTS

| JP | 2001-60277 A | 3/2001 |
| KR | 10-0663636 B1 | 1/2007 |
| KR | 10-2007-0106208 A | 11/2007 |
| KR | 10-2008 0102511 A | 11/2008 |
| KR | 10-2008-0102520 A | 11/2008 |
| KR | 10-0910963 B | 8/2009 |
| KR | 10-2203230 B1 | 10/2020 |

* cited by examiner

*Primary Examiner* — Giovanni Astacio-Oquendo
*Assistant Examiner* — Zannatul Ferdous
(74) *Attorney, Agent, or Firm* — Eric L. Lane; Green Patent & IP Law

(57) ABSTRACT

The present disclosure relates to a method for identifying a coin, and more particularly, to a coin identifying method capable of simultaneously identifying a type of coin and whether the coin is defective. In the coin identifying method of the present disclosure, since the type of coin and whether the coin is defective are simultaneously determined, there is an advantage that efficiency and reliability of identification can be improved.

3 Claims, 7 Drawing Sheets

METHOD FOR IDENTIFYING COIN

CROSS-REFERENCE TO RELATED APPLICATION

This application claims priority to and the benefit of Korean Patent Application No. 10-2021-0153331, filed on Nov. 9, 2021, the disclosure of which is incorporated herein by reference in its entirety.

BACKGROUND

1. Field of the Invention

The present disclosure relates to a method for identifying a coin, and more particularly, to a coin identifying method capable of simultaneously identifying a type of coin and whether the coin is defective.

2. Discussion of Related Art

Generally, as means for payment for public transport, contactless cards, coupon ticket, bills, coins, or the like are used. In a case in which coins are used among the above means for payment, since various types of coins are input, there is great difficulty in counting the coins.

In particular, in a case in which a transportation fee is paid with coins, there are problems that it is not easy to check whether the paid transportation fee is a correct fee, and when a driver checks whether the paid transportation fee is a correct fee, the driver cannot concentrate on driving, and the risk of accidents increases.

Korean Unexamined Patent Application Publication No. 10-2008-0102511 discloses a coin sorting device. The coin sorting device includes a sorting housing in which a circular accommodating portion is formed and coin holes corresponding to different sizes of coins are each perforated in a bottom surface thereof along an inner sidewall of the accommodating portion and a separating rotary plate which is rotatably mounted on the accommodating portion to transfer coins input to the accommodating portion along the inner sidewall of the accommodating portion and separate and discharge the coins through the coin holes according to different types of coins.

Also, Korean Unexamined Patent Application Publication No. 10-2007-0106208 discloses a coin counting device. The disclosed coin counting device includes a rotary plate configured to withdraw coins by a centrifugal force, a high-speed transfer roller configured to withdraw the withdrawn coins again by a rotary force thereof to transfer the withdrawn coins at a high speed, and a transfer path configured to guide the withdrawn coins toward a counting detector, wherein the transfer path has a curved portion provided on a distal end thereof, and an impact absorbing member is disposed on the curved portion to, when the withdrawn coins reach the curved portion from the high-speed transfer roller, reduce an impact thereof and transfer the coins along one sidewall.

Korean Patent Registration No. 10-0663636 discloses a coin counting device, and Korean Patent Registration No. 10-0910963 discloses a coin counting device using a camera and a method of controlling the same.

In the conventional coin counting devices configured as described above, according to different materials of coins, some coins passing through a coin transfer path tend to not be detected in a coin sorting process, and thus reliability of detecting and counting coins cannot be improved. Also, counting input coins and dispensing change are difficult.

Japanese Patent Publication No. 13060277 discloses a coin counting sorting device, and Korean Unexamined Patent Application Publication No. 10-2008-0102520 discloses a recovering device of a teller machine for a coin counter.

The conventional coin counting devices mentioned above have problems that it is not possible to suppress an occurrence of jamming during sorting and counting of coins and it is not possible to discharge defective coins. In a case in which defective coins are not able to be discharged, there is a problem that change cannot be smoothly dispensed.

RELATED ART DOCUMENTS

Patent Documents

Korean Unexamined Patent Application Publication No. 10-2008-0102511: coin sorting device of teller machine for coin counter Korean Patent Registration No. 10-0663636: coin counting device Korean Patent Registration No. 10-0910963: coin counting device using camera and method of controlling the same

SUMMARY OF THE INVENTION

The present disclosure is directed to providing a coin identifying method capable of simultaneously identifying a type of input coin and whether the input coin is defective.

A coin identifying method of the present disclosure includes: a reference data obtaining operation in which different types of normal coins are input to a coin counting device, in which a coin guider forming a coin movement path is provided, to store each of a maximum or minimum frequency value output while the normal coins pass a first inductor of a coin identifier installed on the coin guider, a maximum or minimum frequency value output while the normal coins pass a second inductor, and width values of linear graphs of changes in frequencies from a point in time at which a frequency changes while the normal coins pass the second inductor until the frequency returns to a reference frequency and obtain identification reference value data for each type of the normal coins; and a coin type and defect identifying operation in which a maximum or minimum frequency value output while a coin to be identified, which is input to the coin counting device, passes the first inductor, a maximum or minimum frequency value output while the coin to be identified passes the second inductor, and a width value of a linear graph of changes in frequencies from a point in time at which a frequency changes while the coin to be identified passes the second inductor until the frequency returns to a reference frequency are compared with the identification reference value data to simultaneously determine a type of the coin to be identified and whether the coin to be identified is defective.

The first inductor may be mounted on the coin guider so that, according to a diameter of the normal coin or the coin to be identified moving while in contact with one side portion of the coin guider, an area covered by the normal coin or the coin to be identified changes, and the second inductor may be spaced apart from the first inductor in a direction in which the coin guider extends and may be installed on the coin guider to be more adjacent to the one side portion of the coin guider than the first inductor so that the second inductor is always entirely covered by the normal coin or the coin to be identified.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
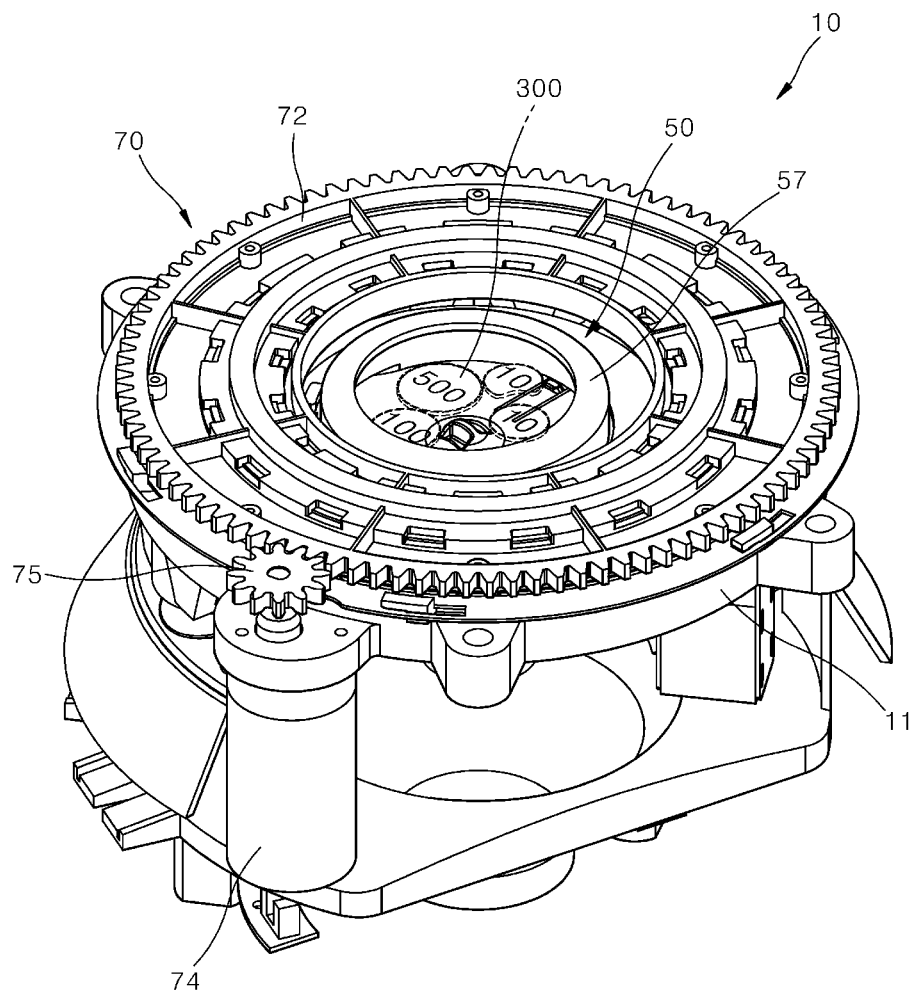
FIG. 1 is a perspective view of a coin counting device to which a coin identifying method according to one embodiment of the present disclosure is applied.
Figure 2:
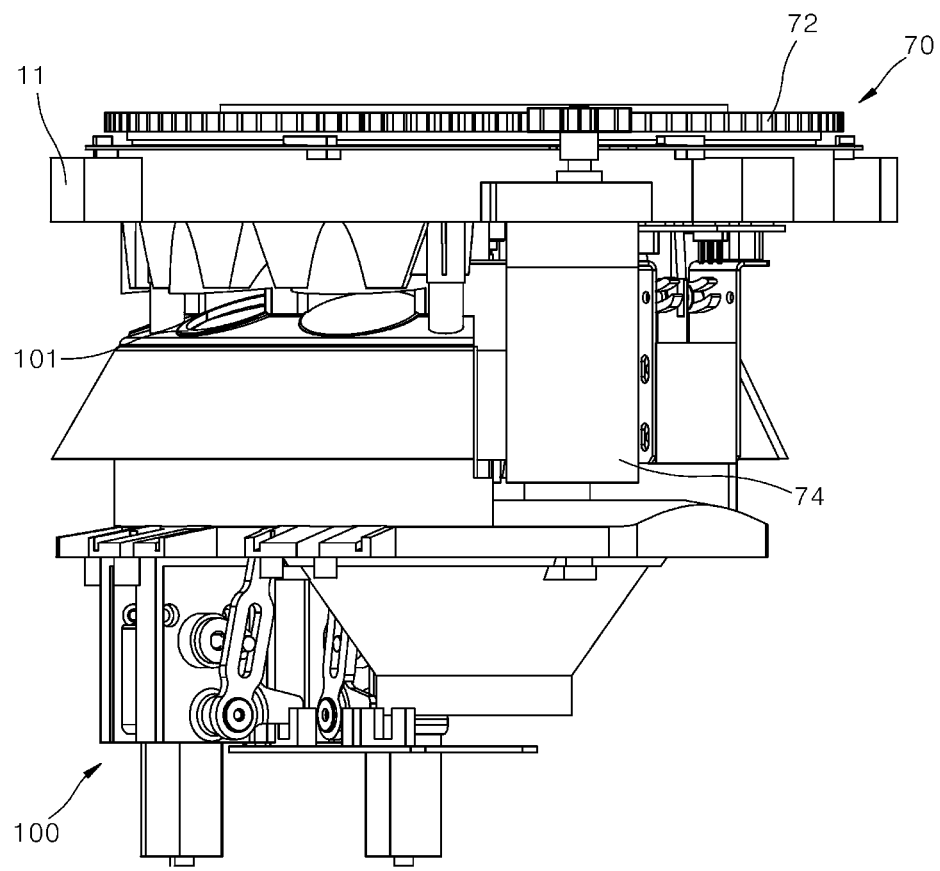
FIG. 2 is a perspective view of a portion of the coin counting device of FIG. 1.

Hereinafter, a coin identifying method according to an exemplary embodiment of the present disclosure will be described in detail with reference to the accompanying drawings.

Prior to describing the coin identifying method according to an embodiment of the present disclosure, a coin counting device 10 to which the coin identifying method according to an embodiment of the present disclosure is applied will be briefly described with reference to FIGS. 1 to 4.

The coin counting device 10 having a defective coin sorter according to the present disclosure includes: a coin separation unit 20; a defective coin discharge unit 30; a coin supply unit 50; a coin transfer unit 70; a coin loading and change discharge unit 100; and a controller (not illustrated).

The coin separation unit 20 is installed on an upper portion of a support frame 11 and includes a coin sorter 25 in which a plurality of coin sorting holes 21 for sorting coins 300 according to sizes of the coins 300 are formed in a circumferential direction and a coin separation plate 28 on which a coin guider 26 for guiding coins to the coin sorter 25 is formed.

The defective coin discharge unit 30 is installed on the coin guider 26 of the coin separation unit 20 to detect whether a coin moving to be sorted is defective and sort a defective coin (not illustrated).

The coin supply unit 50 is installed on a central portion of the coin separation plate 28 to supply coins to be sorted so that the coins to be sorted move along the coin guider 26.

The coin transfer unit 70 elastically comes in close contact with the coin separation plate 28, causes the coins 300 input from the coin supply unit 50 to come in close contact with the coin separation plate 28, and in this state, moves the coins 300 to the coin guider 26 and the coin sorting holes 21.

The coin loading and change discharge unit 100 is installed on the support frame 11 and is installed on a lower surface of the coin separation plate 28 that corresponds to the coin sorting holes 21 of the coin sorter 25 in order to load the sorted coins 300 in coin recovery containers 101 and count the coins 300 and to dispense change using the loaded coins 300.

The coin separation unit 20 includes the coin separation plate 28 in which the plurality of coin sorting holes 21 for sorting the coins 300 according to the sizes of the coins 300 are arranged and formed in the circumferential direction. The coin guider 26 configured to guide the coins 300 so that the coins 300 move along the coin sorting holes 21 arranged in the circumferential direction is formed on an upper portion of the coin separation plate 28.

The coin separation plate 28 is fixed to an upper surface of the support frame 11 and fixed to an upper portion of the support frame 11, but the present disclosure is not limited thereto, and the coin separation plate 28 may be integrally formed with the support frame 11. Also, a rotary disc installation portion 22 on which a rotary disc 51 of the coin supply unit 50 that will be described below is positioned is formed on a central portion of the coin separation plate 28.

The coin sorting holes 21 formed in the coin separation plate 28 are arranged and installed in the circumferential direction, and in order to allow coins with a smaller diameter to be discharged first, the coin sorting holes 21 are formed to have sizes that gradually increase in a counterclockwise direction. The coin sorting holes 21 are formed as many as the number that corresponds to the number of types (number of different values) of coins used in a country where the coin counting device will be installed.

A sorting guide member 29 for guiding the coins that have passed through the coin sorting holes 21 is installed on a lower surface of the coin separation plate 28. In the sorting guide member 29, holes 29a identical to the coin sorting holes 21 and corresponding thereto are formed, and a guide rib 29b which extends downward to guide coins to a coin recovery container which will be described below is formed on an edge of the hole 29a.

Also, a first guide member 127 configured to allow an edge of the coin 300 moving along the coin guider 26 and an edge of the coin sorting hole 21 to match each other is installed on an inner side of the coin guider 26 of the coin separation plate 28, and a second guide member 128 which is spaced apart from the first guide member 127 and has a length extending in the circumferential direction so that the coin 300 moving in the circumferential direction along the coin guider 26 comes in contact therewith is installed on the coin guider 26 in which a coupling hole 34 is formed.

The coin 300 moving along the coin guider 26 is guided by the first guide member 127 and the second guide member 128 and moves to the coin sorter 25.

Meanwhile, a portion of an inner side surface of the first guide member 127 has a trajectory that matches an edge of the rotary disc installation portion 22, and a portion of the first guide member 127 expands outward to form a discharge guider 127a for guiding the coin 300 to the coin guider 26.

The coin supply unit 50 includes the rotary disc 51 installed on the rotary disc installation portion 22 to push a coin outward by a centrifugal force. Also, a rotary disc driving motor 55 for rotating the rotary disc 51 is installed on a lower surface of the coin separation plate 28 or the support frame 11, and a driving shaft of the rotary disc driving motor 55 passes through the rotary disc installation portion 22 to be coupled to the rotary disc 51. Also, a coin input hopper member 57 which surrounds the rotary disc and has a coin inlet 56 formed in an upper portion to allow coins to be input is installed on the support frame 11 or the coin separation plate 28. A lower surface of the coin input hopper member 57 is supported by the first guide member 127 so that a coin outlet 26a is partitioned by the first guide member 127 and the coin input hopper member 57.

The defective coin discharge unit 30 is installed between the coin outlet 26a and the coin sorter 25 and includes a coin identifier 33 which is installed on the coin guider 26 and includes first and second inductors 31 and 32 and a discharge door 42 which is configured to discharge a defective coin detected from the coin identifier 33 from the coin guider 26 before the defective coin enters the coin sorter 25.

The coin identifier 33 is coupled to the coupling hole 34, which is formed in the coin guider 26 of the coin separation plate 28, to form a portion of the coin guider 26 and has a coin guide plate member 35 on which the first and second inductors 31 and 32 are installed provided on a lower portion thereof. A circuit board 36 connected to the first and second inductors 31 and 32 is installed on a lower surface of the coin guide plate member 35.

The coin identifier 33 uses a RLC resonance circuit and is formed of a structure that detects a change in a frequency band.

The coin identifier 33 may include: a RLC resonance circuit which includes an AC power supply, a resistor, a capacitor, and the inductors 31 and 32; and a detector which includes a signal measurer configured to measure an analog signal output from the RLC resonance circuit and a signal processor configured to convert the analog signal measured in the signal measurer into a frequency band.

Although not illustrated, the RLC resonance circuit may consist of: a first circuit in which one side is linked to the AC power supply and connected to a first resistor and a first capacitor and the other end is connected to the first inductor 31; and a second circuit in which one side is linked to the AC power supply and connected to a second resistor and a second capacitor and the other end is connected to the second inductor 32.

The detector may be provided as a plurality of detectors, and the plurality of detectors may be respectively connected to the first circuit and the second circuit and may convert an analog signal, each measured while a coin passes the first inductor 31 or the second inductor 32, into a frequency band and transmit frequency change information to the controller.

Figure 3:
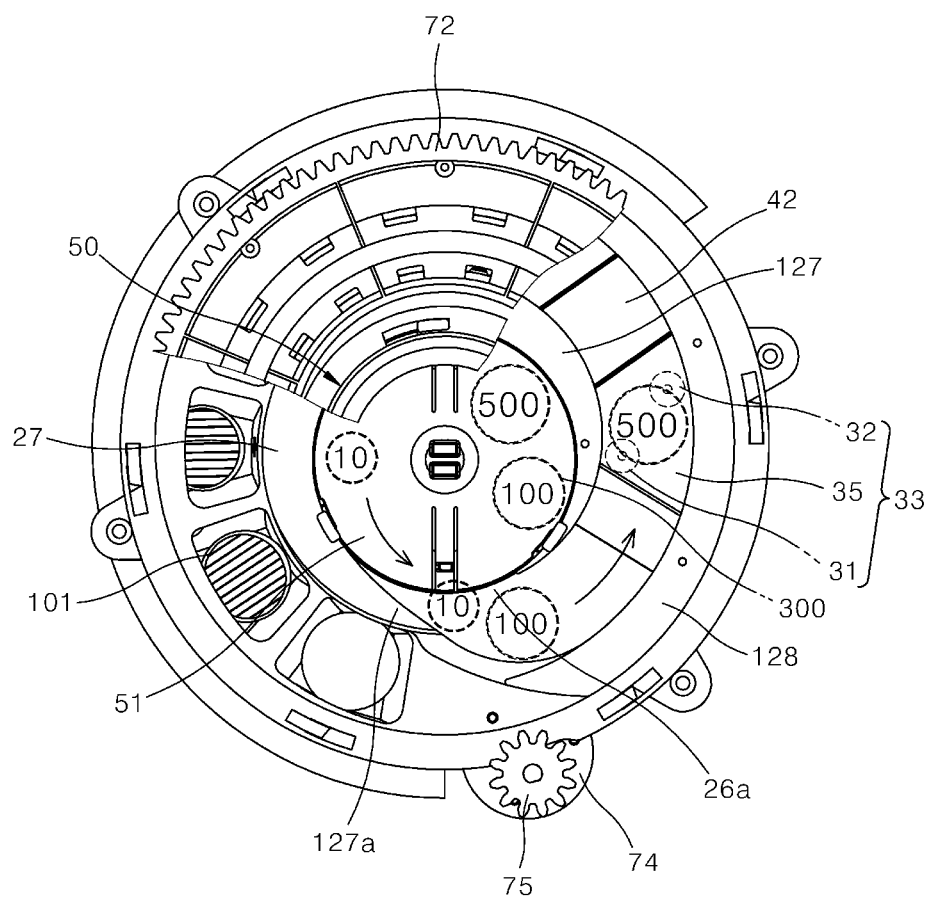
FIG. 3 is a partially cut-out plan view of the coin counting device of FIG. 1.
Figure 4:
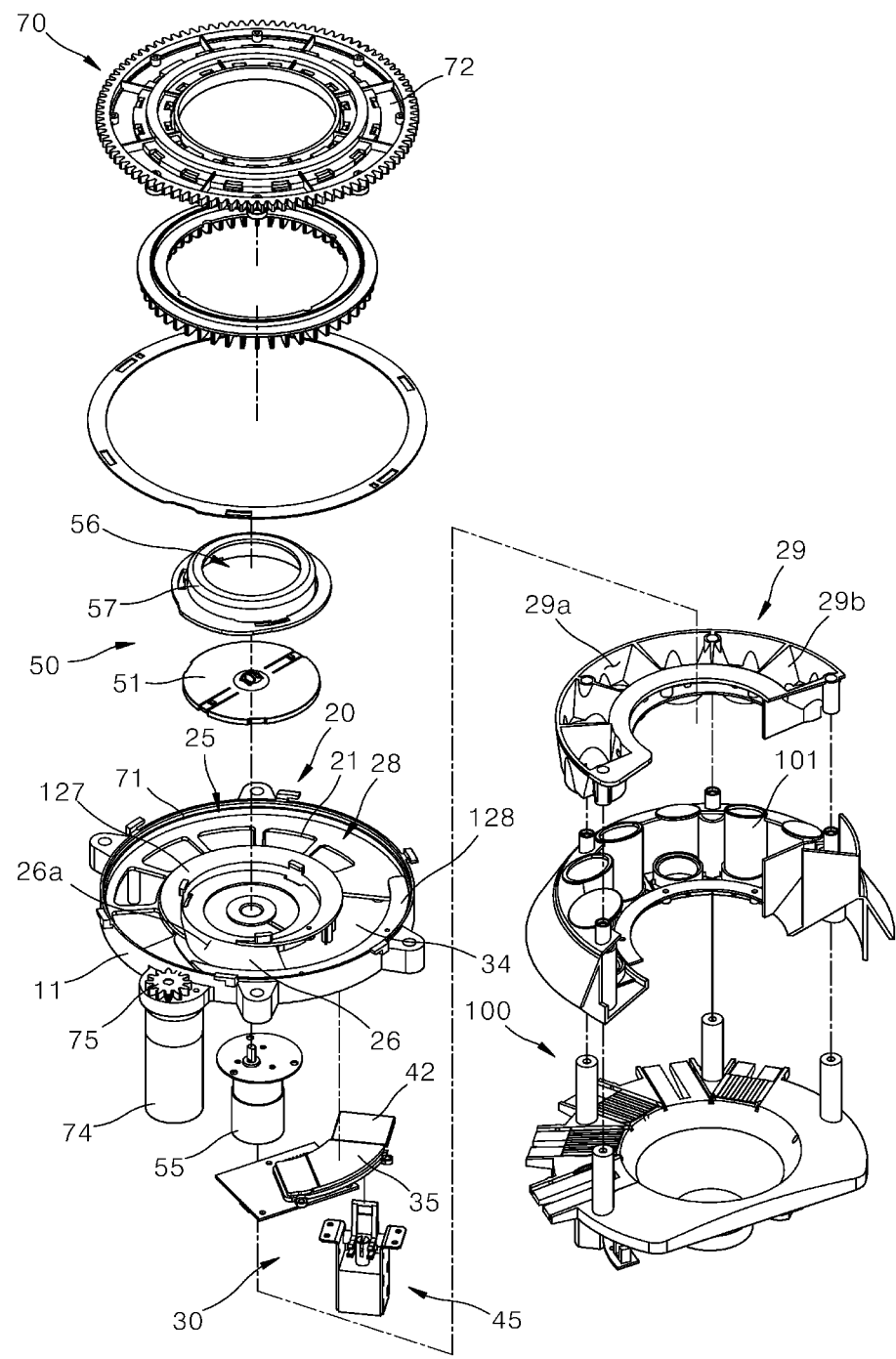
FIG. 4 is an exploded perspective view of the coin counting device of FIG. 1.
Figure 5:
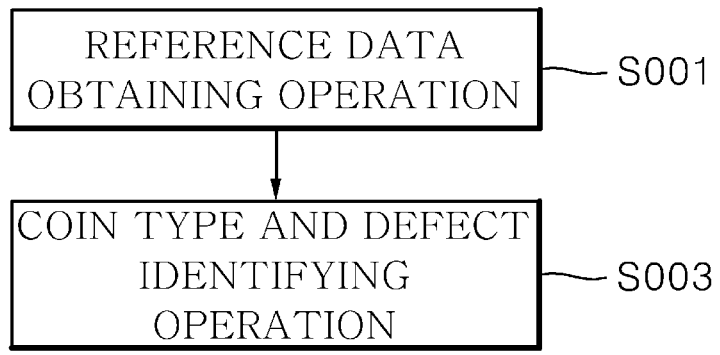
FIG. 5 is a block diagram of a coin identifying method according to an embodiment of the present disclosure.
Figure 6:
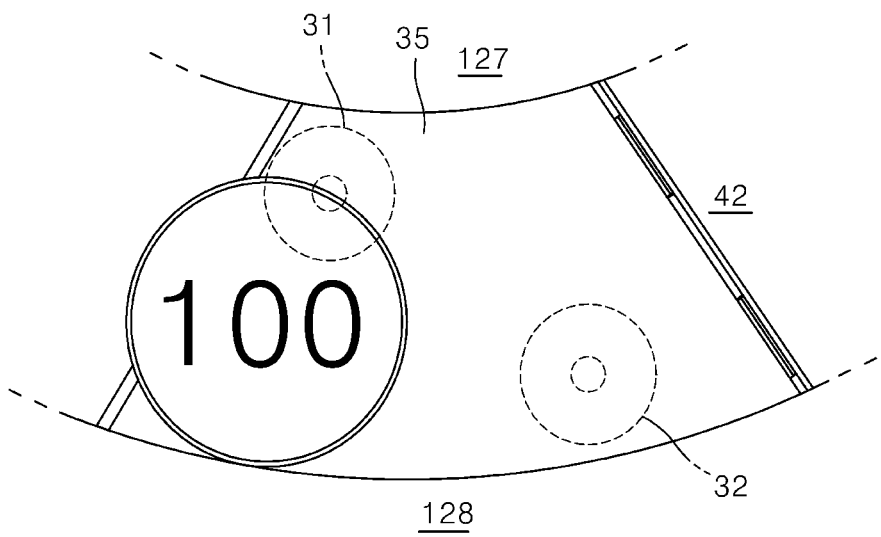
FIG. 6 is a view illustrating a state in which a coin passes a first inductor.
Figure 7:
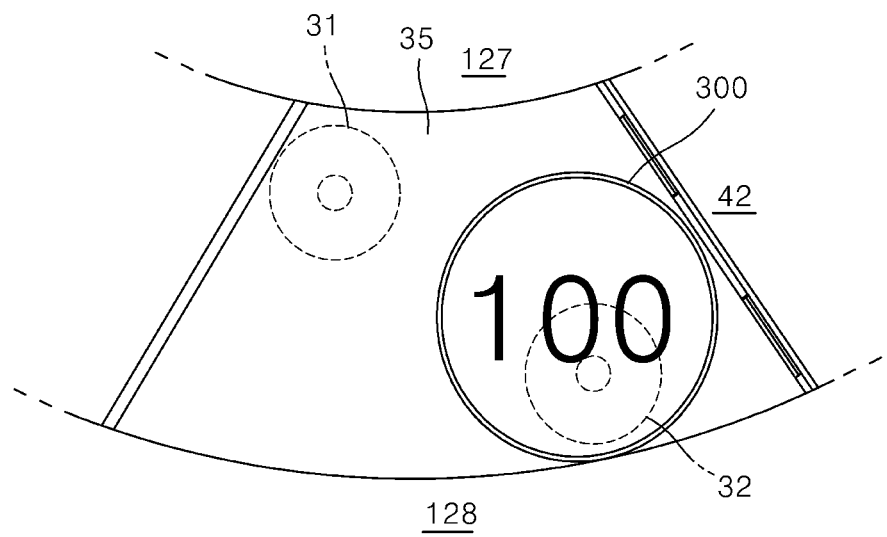
FIG. 7 is a view illustrating a state in which a coin passes a second inductor.

Referring to FIGS. 3, 6, and 7, the first inductor 31 and the second inductor 32 are disposed on a path along which a coin passes. The first inductor 31 is installed at a position more adjacent to the first guide member 127 than to the second guide member 128 between the coin outlet 26a and the second inductor 32. Also, the second inductor 32 is installed at a position more adjacent to the second guide member 128 than to the first guide member 127 between the first inductor 31 and the coin sorter 25.

Due to the position of the first inductor 31, as a coin passes along the coin guider 26 while in contact with the second guide member 128, an area in which the coin overlaps the first inductor 31, that is, an area of the first inductor 31 covered by the coin, always changes according to the type (diameter size) of coin or whether the coin is bent.

Also, a coin moving along the coin guider 26 while in contact with the second guide member 128 always covers the entire second inductor 32 while passing during a predetermined amount of time regardless of the type of coin or whether the coin is defective, but the time during which the coin overlaps the second inductor 32 may vary according to whether the coin is defective. Here, a defective state of a coin may include a bent state, a crushed state, and a broken state.

Meanwhile, as an area in which a coin overlaps the first inductor 31 or the second inductor 32 increases and then decreases while the coin moves along the coin guider 26, a frequency output from the coin identifier 33 may be changed.

Figure 8:
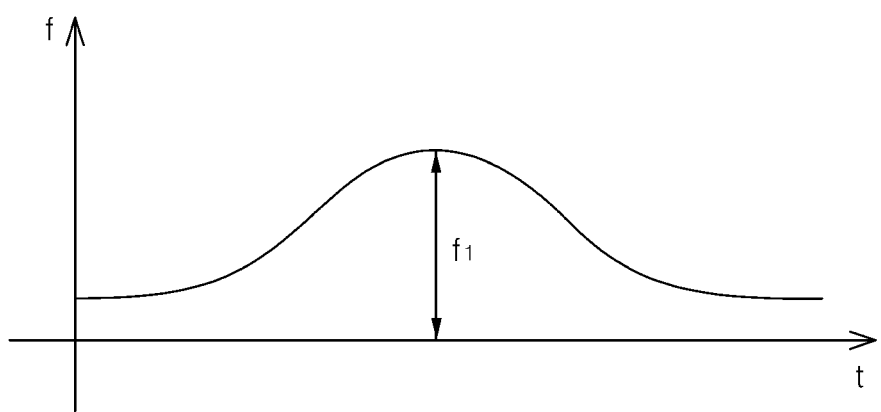
FIG. 8 is a view relating to changes in frequencies when a coin made of a nonferrous material passes the first inductor.
Figure 9:
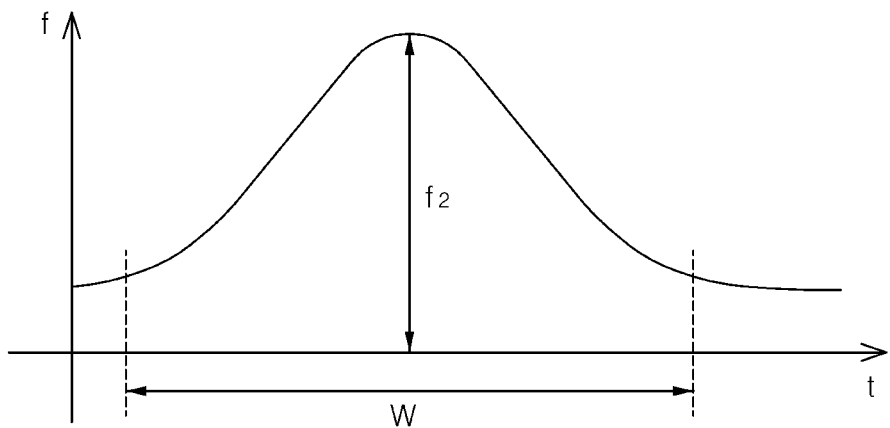
FIG. 9 is a view relating to changes in frequencies when a coin made of a nonferrous material passes the second inductor.

FIGS. 8 and 9 are linear graphs showing changes in output frequencies according to an area in which a coin made of a nonferrous material overlaps the first and second inductors 31 and 32 while the coin passes the first and second inductors 31 and 32.

In a case in which a coin is made of a nonferrous material, while the coin passes the first and second inductors 31 and 32, a frequency increases and then decreases as illustrated. In a case in which a coin is made of a ferrous material, although not illustrated, a frequency decreases and then increases. Also, in a case in which a coin is made of a material in which ferrous and nonferrous materials are mixed, a frequency may repeat increasing and decreasing or may repeat decreasing and increasing.

Among the frequency change information transmitted from the detector, the controller may derive a maximum or minimum frequency value $f_1$ output while a coin passes the first inductor and a maximum or minimum frequency value $f_2$ output while the coin passes the second inductor. That is, the maximum frequency value $f_1$ or the minimum frequency value $f_2$ is a frequency shown when the coin maximally covers the first inductor 31 or the second inductor 32 while passing the first and second inductors 31 and 32.

Specifically, the controller may be set to derive the maximum frequency value in a case in which a frequency gradually increases and then decreases while a coin passes the first and second inductors 31 and 32 and may be set to derive the minimum frequency value in a case in which a frequency gradually decreases and then increases while the coin passes the first and second inductors 31 and 32. Also, the controller may be set to derive the maximum frequency value in a case in which a frequency repeats increasing and decreasing. That is, in a case in which a coin passing the first and second inductors 31 and 32 is made of a nonferrous material, the controller derives the maximum frequency value, in a case in which the coin is made of a ferrous material, the controller derives the minimum frequency value, and in a case in which the coin is made of a material in which ferrous and nonferrous materials are mixed, the controller derives the maximum frequency value.

Also, the controller may measure an amount of time w from a point in time at which a frequency increases when a coin passes the second inductor 32 until the frequency returns to a reference frequency. Here, the reference frequency is a frequency output from the detector connected to the second inductor 32 before a coin overlaps the second inductor 32. Referring to FIG. 9, the amount of time w corresponds to a width from a point in time at which a frequency increases until the frequency returns to the reference frequency in the linear graph of changes in frequencies with time.

The maximum or minimum frequency value $f_1$ generated when a coin passes the first inductor 31 may be classified into a maximum or minimum frequency value output while a normal coin passes the first inductor 31 in a reference data obtaining operation of a coin identifying method which will be described below and a maximum or minimum frequency value $f_1$ output while a coin to be identified passes the first inductor 31 in a coin type and defect identifying operation of the coin identifying method which will be described below.

Also, the maximum or minimum frequency value $f_2$ generated when a coin passes the second inductor 32 may be classified into a maximum or minimum frequency value $f_2'$ output while a normal coin passes the second inductor 32 in the reference data obtaining operation and a maximum or minimum frequency value $f_2''$ output while a coin to be identified passes the second inductor 32 in the coin type and defect identifying operation of the coin identifying method which will be described below.

Also, a width value w from a point in time at which a frequency increases until the frequency returns to the reference frequency may be classified into a width value w' when a normal coin passes the second inductor 32 in the reference data obtaining operation and a width value w when a coin to be identified passes the second inductor 32 in the coin type and defect identifying operation.

In the controller, the maximum or minimum frequency value $f_1'$ output while each normal coin passes the first inductor 31 is set as a first reference value, the maximum or minimum frequency value $f_1''$ output while each normal coin passes the second inductor 32 is set as a second reference value, and the width value w' from a point in time at which a frequency increases when each normal coin passes the second inductor 32 until the frequency returns to the reference frequency is set as a third reference value.

In the controller, the first to third reference values transmitted and derived as the same type of normal coin is repeatedly input 20 times or more to the coin counting device 1 may be repeatedly stored, and ranges of the first to third reference values may be learned for each type of normal coin.

Also, in the controller, through the frequency change information transmitted from the detector, comparison target value data is obtained in which the maximum or minimum frequency value $f_2'$ output while a coin to be identified passes the first inductor 31 is set as a first measurement value, the maximum or minimum frequency value $f_2''$ output while a coin to be identified passes the second inductor 32 is set as a second measurement value, and the width value w" from a point in time at which a frequency increases when a coin to be identified passes the second inductor 32 until the frequency returns to the reference frequency is set as a third measurement value.

The controller compares the first measurement value with the first reference value or the range of the first reference value for each type of normal coin, compares the second measurement value with the second reference value or the range of the second reference value for each type of normal coin, compares the third measurement value with the third reference value or the range of the third reference value for each type of normal coin, simultaneously determines the type of coin to be identified and whether the coin to be identified is defective, and controls opening and closing of the discharge door 42. Detailed description thereof will be given below in description of a method of identifying a defective coin according to the present disclosure.

Meanwhile, the discharge door 42 forms a defective coin outlet 41 in the coin guider 26. The discharge door 42 forms a portion of the coin guider 26 and is configured to, when a defective coin moves, open the defective coin outlet 41 to allow the defective coin to be discharged and, when a normal coin moves, close the defective coin outlet 41 so that the coin 300 moves to the coin sorter 25.

The opening and closing of the discharge door 42 are performed by a door opening/closing driver 45. Although not illustrated in detail, the door opening/closing driver 45 may be driven by a link operated by a solenoid connected to the controller.

Meanwhile, the coin transfer unit 70 includes a ring gear 72 rotatably installed by being guided to an inner circumferential surface of a guide ring 71 forming the support frame 11 on an upper portion of the coin separation plate 28 supported by the support frame 11, a driving motor 74 installed on the support frame 11 and the coin separation plate 28, and a driving gear 75 installed on a driving shaft of the driving motor 74 and engaged with the ring gear 72.

Also, the coin loading and change discharge unit 100 has a structure in which coins 300 sorted by the coin separation unit 20 are loaded in the coin recovery containers 101 and the coins loaded in the coin recovery containers 101 are discharged to dispense change.

As structures of the door opening/closing driver 45, the coin transfer unit 70, and the coin loading and change discharge unit 100, structures disclosed in Korean Patent Registration No. 10-2203230 (coin counting device) filed by the present applicant may be applied, and detailed descriptions thereof will be omitted.

Hereinafter, a coin identifying method according to an embodiment of the present disclosure that uses the coin counting device 1 having the structure described above will be described.

Referring to FIGS. 5 to 9, the coin identifying method according to an embodiment of the present disclosure includes a reference data obtaining operation (S001) and a coin type and defect identifying operation (S003).

The reference data obtaining operation (S001) is an operation in which different types of normal coins are input to the coin counting device 1 to store the maximum or minimum frequency value $f_1'$, which is output while a normal coin passes the first inductor 31 of the coin identifier 33 installed on the coin guider 26 extending in the circumferential direction, as a first reference value, store the maximum or minimum frequency value $f_2'$, which is output while a normal coin passes the second inductor 32, as a second reference value, and store the width value w' of a linear graph of changes in frequencies from a point in time at which a frequency changes when a normal coin passes the second inductor 32 until the frequency returns to the reference frequency as a third reference value, thus obtaining identification reference value data for each type of normal coin.

In the reference data obtaining operation (S001), first to third reference values derived by inputting the same type of normal coin 20 times or more to the coin counting device may be repeatedly stored to obtain identification reference value data for each type of normal coin. That is, the identification reference value data includes information on a first reference value range, a second reference value range, and a third reference value range for each type of normal coin.

The coin type and defect identifying operation (S003) is an operation in which the maximum or minimum frequency value $f_1''$ output while a coin to be identified, which is input to the coin counting device 1, passes the first inductor 31, the maximum or minimum frequency value $f_2''$ output while the coin to be identified passes the second inductor 32, and the width value w" of a linear graph of changes in frequencies from a point in time at which a frequency changes while the coin to be identified passes the second inductor 32 until the frequency returns to the reference frequency are compared with the identification reference value data to simultaneously determine a type of the coin to be identified and whether the coin to be identified is defective.

The coin type and defect identifying operation (S003) may include: a comparison data obtaining operation in which the maximum or minimum frequency value $f_1''$ output while a coin to be identified passes the first inductor 31 is stored as a first measurement value, the maximum or minimum frequency value $f_2''$ output while the coin to be identified passes the second inductor 32 is stored as a second measurement value, and the width value $w''$ of a linear graph of changes in frequencies from a point in time at which a frequency changes while the coin to be identified passes the second inductor 32 until the frequency returns to the reference frequency is stored as a third measurement value in order to obtain comparison target value data; and a determining operation in which the first measurement value is compared with the first reference value or the range of the first reference value for each type of normal coin, the second measurement value is compared with the second reference value or the range of the second reference value for each type of normal coin, the third measurement value is compared with the third reference value or the range of the third reference value for each type of normal coin, and whether a value corresponding to the ranges which include the first to third measurement values or a value corresponding to the first to third measurement values is present in the identification reference value data is determined to simultaneously determines the type of coin to be identified and whether the coin to be identified is defective.

The determining operation may include a first determining operation in which the first measurement value and the second measurement value are compared with the first and second reference values or the ranges of the first and second reference values of the identification reference value data to primarily determine the type of coin to be identified and a second determining operation in which the third reference value of the normal coin, which corresponds to the type of coin to be identified determined in the first determining operation, is compared with the third measurement value or the range of the third measurement value to finally determine the type of coin to be identified and whether the coin to be identified is defective.

Meanwhile, diameters and materials differ for each type of normal coin. For example, among the Korean coins, the ten-won coin has a diameter of 18 mm and is made up of 48% copper and 52% aluminum, a fifty-won coin has a diameter of 21.6 mm and is made up of 70% copper, 18% zinc, and 12% nickel, a hundred-won coin has a diameter of 24 mm and is made up of 75% copper and 25% nickel, and a five-hundred-won coin has a diameter of 26.5 mm and is made up of 75% copper and 25% nickel.

Accordingly, for each type of normal coin, an area overlapping the first inductor 31 is different, and even among the same type of coins, an area overlapping the first inductor 31 is different according to whether a coin is defective, e.g., bent. Also, the time during which a coin to be identified passes the second inductor 32 may vary according to whether the coin is defective, e.g., bent.

Therefore, according to the type and material of a coin to be identified and whether the coin to be identified is defective, the maximum or minimum frequency value $f_1''$ output while the coin to be identified passes the first inductor 31, the maximum or minimum frequency value $f_2''$ output while the coin to be identified passes the second inductor 32, and the width value $w''$ of a linear graph of changes in frequencies from a point in time at which a frequency changes while the coin to be identified passes the second inductor 32 until the frequency returns to the reference frequency are each derived differently.

The diameter of the coin to be identified may be determined through the maximum or minimum frequency value $f_1''$ output while the coin to be identified passes the first inductor 31, and the type of the coin to be identified may be determined by determining the material of the coin to be identified through the maximum or minimum frequency value $f_2''$ output while the coin to be identified passes the second inductor 32.

Also, whether the coin to be identified is defective may be determined through the width value $w''$ of the linear graph of changes in frequencies from a point in time at which a frequency changes while the coin to be identified passes the second inductor 32 until the frequency returns to the reference frequency.

The tables below are examples. Table 1 shows ranges of the first to third reference values derived by each type of normal coin repeatedly passing the first and second inductors 31 and 32, and Table 2 shows a summary of results of simultaneously determining the type of coin and whether the coin is defective through the first to third measurement values while coins to be identified pass the first and second inductors 31 and 32.

TABLE 1

|  | $f_1'$ | $f_2'$ | $w'$ |
|---|---|---|---|
| Normal coin 1 | 2.89-3.12 | 4.95-5.12 | 3.95-4.15 |
| Normal coin 2 | 1.88-2.14 | 4.95-5.12 | 1.95-2.15 |

TABLE 2

|  | $f_1''$ | $f_2''$ | $w''$ | Results of determining |
|---|---|---|---|---|
| Coin to be identified 1 | 3.05 | 5.00 | 3.98 | Normal coin 1 |
| Coin to be identified 2 | 3.10 | 5.05 | 3.40 | Defective |
| Coin to be identified 3 | 2.08 | 4.96 | 3.01 | Defective |

Since the first to third measurement values of the coin to be identified 1 respectively fall within the ranges of the first to third reference values of the normal coin 1, the coin to be identified 1 is determined as the normal coin 1.

The coin to be identified 2 may be primarily determined as the same type of the normal coin 1 when, in the first determining operation, only the first measurement value, which is the maximum or minimum frequency value $f_1''$ output while the coin passes the first inductor 31, and the second measurement value, which is the maximum or minimum frequency value $f_2''$ output while the coin passes the second inductor 32, are compared. However, since, in the second determining operation, the third measurement value of the coin to be identified 2 deviates from the range of the third reference value of the normal coin 1, the coin to be identified 2 is determined as a defective coin and may be a different type of coin from the normal coin 1.

The coin to be identified 3 may be primarily determined as the same type of the normal coin 2 due to the first and second measurement values each falling within the ranges of the first and second reference values of the normal coin 2.

However, since the third measurement value of the coin to be identified 3 deviates from the range of the third reference value of the normal coin 2, the coin to be identified 3 is determined as a defective coin and may be a different type of coin from the normal coin 2.

In this way, in a case in which a coin to be identified is a defective coin which is bent, the maximum or minimum frequency value $f_1''$, that is, the first measurement value, differs when the coin moves along the coin guider while a bent portion of the coin overlaps the first inductor 31 and when the coin moves along the coin guider while a normal portion of the coin overlaps the first inductor 31.

Therefore, the type of coin to be identified may be erroneously determined when just the maximum or minimum frequency value $f_1''$ output while the coin to be identified passes the first inductor 31 and the maximum or minimum frequency value $f_2''$ output while the coin to be identified passes the second inductor 32 are used.

Accordingly, the type of coin to be identified and whether the coin to be identified is defective may be finally determined by comparing the identification reference value data with the maximum or minimum frequency value $f_1''$ output while the coin to be identified passes the first inductor 31, the maximum or minimum frequency value $f_2''$ output while the coin to be identified passes the second inductor 32, and the width value w" of the linear graph of changes in frequencies from a point in time at which a frequency changes until the frequency returns to the reference frequency.

In a case in which a decimal part is present in the first to third measurement values, the controller may round off the numbers to certain decimal places in the decimal part of the first to third measurement values to compare the first to third measurement values with the ranges of the first to third reference values. For example, the controller may round off the numbers to three decimal places or four decimal places in the decimal part of the first to third measurement values to compare the first to third measurement values with the ranges of the first to third reference values.

In this way, in the coin identifying method according to an embodiment of the present disclosure, the first to third measurement values of the coin to be identified are compared with the first to third reference values of each normal coin, and when the coin to be identified passes the first and second inductors 31 and 32, whether a normal coin whose ranges of the first to third reference values include the first to third measurement values of the coin to be identified is present is determined, and when a normal coin satisfying all the conditions is not present, the coin to be identified is determined as a defective coin.

Meanwhile, different from the example presented above, average values of first reference values, second reference values, and third reference values which are derived by inputting the same normal coin 20 times or more to the coin counting device 1 may be compared with the first to third measurement values. In this case, the controller may calculate an average value of first reference values, an average value of second reference values, and an average value of third reference values for each type of normal coin and may set error ranges for the average values of the first to third reference values for each type of normal coin to determine whether the measured first to third measurement values are within the set error ranges, thus simultaneously determining the type of coin to be identified and whether the coin to be identified is defective.

In the coin identifying method according to an embodiment of the present disclosure which has been described above, since the maximum or minimum frequency value $f_1''$ output while the coin to be identified passes the first inductor 31, the maximum or minimum frequency value $f_2''$ output while the coin to be identified passes the second inductor 32, and the width value w" of the linear graph of changes in frequencies from a point in time at which a frequency changes while the coin to be identified passes the second inductor until the frequency returns to the reference frequency are compared with the first to third reference values set for each type of normal coin to simultaneously determine the type of coin and whether the coin is defective, there is an advantage that efficiency and reliability of identification can be improved.

Figure 10:
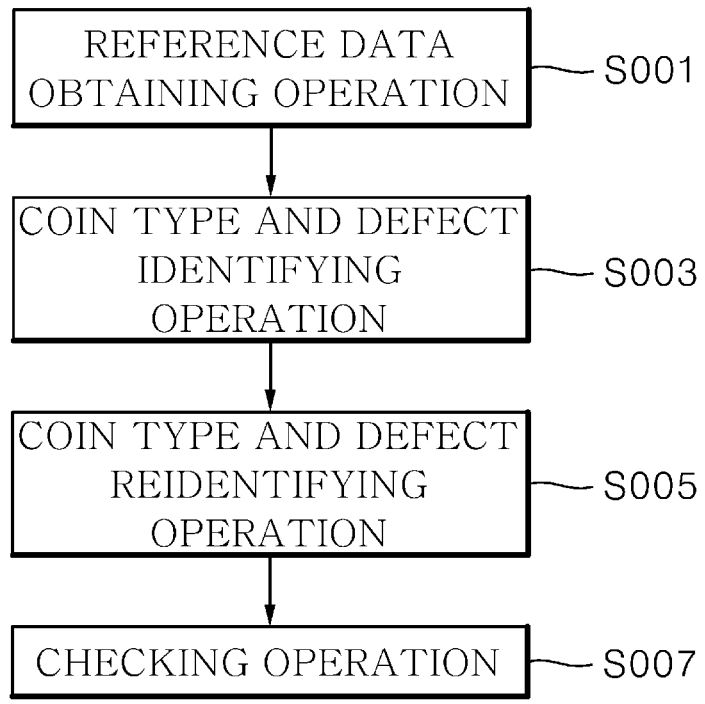
FIG. 10 is a block diagram of a coin identifying method according to another embodiment of the present disclosure.

Meanwhile, FIG. 10 illustrates a block diagram of a coin identifying method according to another embodiment of the present disclosure.

In order to improve reliability of identifying a coin and determining whether the coin is defective, the coin identifying method according to another embodiment of the present disclosure further includes a coin type and defect reidentifying operation (S005) and a checking operation (S007).

A coin counting device of the coin identifying method according to another embodiment of the present disclosure further includes an auxiliary coin identifier. The auxiliary coin identifier has the same configuration as the above-described coin identifier 33 and includes a third inductor (not illustrated) positioned on the same circumferential trajectory line as the first inductor 31 between the coin identifier and the discharge door 42 and a fourth inductor (not illustrated) positioned on the same circumferential trajectory line as the second inductor 32. Detailed descriptions thereof will be omitted.

The coin type and defect reidentifying operation (S005) may include an auxiliary comparison data obtaining operation in which first to third auxiliary measurement values derived while a coin to be identified, which has passed the coin identifier 33, passes the auxiliary coin identifier (not illustrated) are obtained, and an auxiliary determining operation in which first to third reference values for each type of normal coin are compared with the first to third auxiliary measurement values to simultaneously redetermine the type of coin to be identified and whether the coin to be identified is defective.

The controller compares a first auxiliary measurement value, which is a maximum or minimum frequency value output while the coin to be identified passes the third inductor of the auxiliary coin identifier, a second auxiliary measurement value, which is a maximum or minimum frequency value output while the coin to be identified passes the fourth inductor of the auxiliary coin identifier, and a third auxiliary measurement value, which is a width value of a linear graph of changes in frequencies from a point in time at which a frequency changes while the coin to be identified passes the fourth inductor until the frequency returns to the reference frequency, with the first to third reference values for each type of normal coin to simultaneously redetermine the type of coin to be identified and whether the coin to be identified is defective.

The auxiliary determining operation may include a third determining operation in which the first auxiliary measurement value and the second auxiliary measurement value are compared with the range of the first reference value and the range of the second reference value for each normal coin to redetermine the type of coin to be identified and a fourth determining operation in which the range of the third reference value of the normal coin, which corresponds to the type of coin to be identified determined in the third determining operation, is compared with the third auxiliary measurement value to finally determine the type of coin to be identified and whether the coin to be identified is defective.

The checking operation (S007) is an operation in which the coin to be identified is finally determined as a defective coin when any one of a primary identification result and a secondary identification result indicates that the coin to be identified is determined as a defective coin. That is, the controller of the coin counting device controls opening and closing of the discharge door 42 so that the defective coin outlet 41 is opened when any one of the primary identification result and the secondary identification result indicates that the coin to be identified is determined as a defective coin.

In the coin identifying method according to another embodiment of the present disclosure, since a coin to be identified is identified primarily and secondarily to determine the type of coin and whether the coin is defective, reliability can be further improved.

According to a coin identifying method of the present disclosure, since a maximum or minimum frequency value output while a coin to be identified passes a first inductor, a maximum or minimum frequency value output while the coin to be identified passes a second inductor, and a width value of a linear graph of changes in frequencies from a point in time at which a frequency changes while the coin to be identified passes the second inductor until the frequency returns to a reference frequency are compared with reference values set for different types of normal coins in order to simultaneously determine a type of the coin to be identified and whether the coin to be identified is defective, there is an advantage in that efficiency and reliability of identification can be improved.

A coin identifying method of the present disclosure has been described above with reference to embodiments illustrated in the drawings, but the above embodiments are merely illustrative, and those of ordinary skill in the art should understand that various modifications and other equivalent embodiments are possible from the above embodiments. Therefore, the true technical scope of the present disclosure should be defined by the technical spirit of the appended claims.

What is claimed is:

1. A coin identifying method comprising:
    a reference data obtaining operation in which different types of coins are input to a coin counting device, in which a coin guider forming a coin movement path is provided, to store each of a maximum or minimum frequency value output while the different types of coins pass a first inductor of a coin identifier installed on the coin guider, a maximum or minimum frequency value output while the different types of coins pass a second inductor, and width values of linear graphs of changes in frequencies from a point in time at which a frequency changes while the different types of coins pass the second inductor until the frequency returns to a reference frequency and obtain identification reference value data for each type of the different types of coins; and
    a coin type and defect identifying operation in which a maximum or minimum frequency value output while a coin of the different types of coins to be identified, which is input to the coin counting device, passes the first inductor, the maximum or minimum frequency value output while the coin of the different types of coins to be identified passes the second inductor, and a width value of a linear graph of the width values of linear graphs of changes in frequencies from a point in time at which a frequency changes while the coin of the different types of coins to be identified passes the second inductor until the frequency returns to a reference frequency are compared with the identification reference value data to simultaneously determine a type of the coin to be identified and whether the coin of the different types of coins to be identified is defective,
    wherein the first inductor is mounted on the coin guider so that, according to a diameter of the coin of the different types of coins to be identified moving while in contact with one side portion of the coin guider, an area covered by the coin of the different types of coins to be identified changes, and the second inductor is spaced apart from the first inductor in a direction in which the coin guider extends and is installed on the coin guider to be more adjacent to the one side portion of the coin guider than the first inductor so that the second inductor is entirely covered by the coin of the different types of coins to be identified which moves while in contact with the one side portion of the coin guider.

2. The coin identifying method of claim 1, wherein the coin type and defect identifying operation includes:
    a comparison data obtaining operation in which the maximum or minimum frequency value output while the coin of the different types of coins to be identified passes the first inductor is stored as a first measurement value, the maximum or minimum frequency value output while the coin of the different types of coins to be identified passes the second inductor is stored as a second measurement value, and the width value of the linear graph of the changes in the frequencies from the point in time at which the frequency changes while the coin to be identified passes the second inductor until the frequency returns to the reference frequency is stored as a third measurement value in order to obtain comparison target value data; and
    a determining operation in which the first measurement value is compared with maximum or minimum frequency values output while each type of the coin of the different types of coins passes the first inductor, the second measurement value is compared with the maximum or minimum frequency values output while each type of the coin of the different types of coins passes the second inductor, the third measurement value is compared with width values of linear graphs of changes in frequencies from a point in time at which a frequency changes while each type of the coin of the different types of coins passes the second inductor until the frequency returns to the reference frequency, and whether the coin of the different types of coins from which the first to third measurement values are derivable while the coin of the different types of coins to be identified passes the first and second inductors is determined to simultaneously determines the type of the coin of the different types of coins to be identified and whether the coin of the different types of coins to be identified is defective.

3. The coin identifying method of claim 1, further comprising:
    a coin type and defect reidentifying operation in which the maximum or minimum frequency value output while the coin of the different types of coins to be identified, which has passed the coin identifier, passes a third inductor of an auxiliary coin identifier, the maximum or minimum frequency value output while the coin of the different types of coins to be identified passes a fourth inductor of the auxiliary coin identifier, and the width value of the linear graph of the width values of linear graphs of changes in frequencies from a point in time at which a frequency changes while the coin of the different types of coins to be identified passes the fourth inductor until the frequency returns to the reference frequency are compared with the identification reference value data to simultaneously determine the type of the coin to be identified and whether the coin of the different types of coins to be identified is defective; and a checking operation in which the coin of the different types of coins to be identified is finally determined as a defective coin in response to any one of an identification result of the coin type and defect identifying operation and an identification result of the coin type and defect reidentifying operation indicating that the coin of the different types of coins to be identified is determined as the defective coin.

\* \* \* \* \*